(12) United States Patent
Beuschel et al.

(10) Patent No.: US 10,989,323 B2
(45) Date of Patent: Apr. 27, 2021

(54) PNEUMATIC SOLENOID VALVE

(71) Applicant: Conti Temic microelectronic GmbH, Nuremberg (DE)

(72) Inventors: Michael Beuschel, Stammham (DE); Stefan Bauer, Engelbrechtsmuenster (DE); Holger Fernengel, Ingolstadt (DE); Alexander Kerler, Titting OT Petersbuch (DE); Martin Kolbinger, Riedenburg/Buch (DE)

(73) Assignee: Conti Temic microelectronic GmbH, Nuremberg (DE)

(*) Notice: Subject to any disclaimer, the term of this patent is extended or adjusted under 35 U.S.C. 154(b) by 114 days.

(21) Appl. No.: 15/766,279

(22) PCT Filed: Sep. 21, 2016

(86) PCT No.: PCT/EP2016/072370
§ 371 (c)(1),
(2) Date: Apr. 5, 2018

(87) PCT Pub. No.: WO2017/060082
PCT Pub. Date: Apr. 13, 2017

(65) Prior Publication Data
US 2018/0292019 A1 Oct. 11, 2018

(30) Foreign Application Priority Data
Oct. 5, 2015 (DE) .................. 10 2015 219 197.4

(51) Int. Cl.
*F16K 31/06* (2006.01)
*F16K 31/10* (2006.01)
*F16K 11/14* (2006.01)

(52) U.S. Cl.
CPC .......... *F16K 31/0627* (2013.01); *F16K 11/14* (2013.01); *F16K 31/0682* (2013.01);
(Continued)

(58) Field of Classification Search
CPC ...... F16K 11/14; F16K 31/10; F16K 31/0682; F16K 31/0627; Y10T 137/86622;
(Continued)

(56) References Cited

U.S. PATENT DOCUMENTS 3,420,494 A * 1/1969 Egner ................ F16K 31/0682
251/129.03
3,470,911 A * 10/1969 Dunn ................ G05D 16/2093
137/625.64
(Continued)

FOREIGN PATENT DOCUMENTS

CN 1165502 A 11/1997
CN 201013926 Y 1/2008
(Continued)

OTHER PUBLICATIONS

English translation for DE102005035449, taken from Internet on Jan. 10, 2019 [www.espacenet.com] (Year: 2019).*
(Continued)

*Primary Examiner* — Craig J Price

(57) ABSTRACT

A pneumatic solenoid valve, comprising an electromagnetic actuator and an air chamber with multiple air connections configured to be connected with the interposition of the air chamber via multiple switching positions of the magnetic actuator is disclosed. The actuator is configured to assume three different switching positions by energizing the actuator in a unipolar manner with three different current intensities and to move first and second sealing element via an actuation mechanism when switching between the switching positions. In a first position, a first sealing element closes a first air connection, and a second sealing element releases a second air connection. In a second switching position, the first sealing element closes the first air connection, and the second sealing element closes the second air connection. In a third switching position, the first sealing element releases
(Continued)

the first air connection, and the second sealing element closes the second air connection.

8 Claims, 6 Drawing Sheets

(52) U.S. Cl.
CPC ....... *F16K 31/10* (2013.01); *Y10T 137/86847* (2015.04); *Y10T 137/87756* (2015.04)

(58) Field of Classification Search
CPC ..... Y10T 137/86847; Y10T 137/87748; Y10T 137/87756; Y10T 137/8778; Y10T 137/87837; Y10T 137/87861
USPC ........................................ 137/625.65, 625.44
See application file for complete search history.

(56) References Cited

U.S. PATENT DOCUMENTS

| | | | | |
|---|---|---|---|---|
| 3,683,962 | A * | 8/1972 | Good | F16K 11/168 |
| | | | | 137/868 |
| 3,982,562 | A * | 9/1976 | Pickett | F16K 31/105 |
| | | | | 137/625.4 |
| 3,991,788 | A | 11/1976 | Kull | |
| 4,250,924 | A * | 2/1981 | Sakakibara | F16K 31/0624 |
| | | | | 137/596.17 |
| 4,446,889 | A * | 5/1984 | Sakakibara | F16K 31/0624 |
| | | | | 137/625.4 |
| 4,527,590 | A * | 7/1985 | Kolze | F16K 31/10 |
| | | | | 137/596.17 |
| 4,545,563 | A * | 10/1985 | Morioka | F16K 31/0624 |
| | | | | 137/625.2 |
| 4,986,308 | A * | 1/1991 | Champseaux | F16K 31/105 |
| | | | | 137/625.44 |
| 5,658,050 | A * | 8/1997 | Lorbiecki | B62J 1/12 |
| | | | | 297/452.41 |
| 5,687,765 | A | 11/1997 | You | |
| 6,394,136 | B1 * | 5/2002 | Rohrbeck | F16K 11/052 |
| | | | | 137/625.44 |
| 6,484,754 | B1 * | 11/2002 | Muth | F16K 11/052 |
| | | | | 137/625.44 |
| 6,786,238 | B2 * | 9/2004 | Frisch | F16K 31/0682 |
| | | | | 137/625.44 |
| 6,929,019 | B2 * | 8/2005 | Weinmann | F16K 31/006 |
| | | | | 137/15.21 |
| 8,893,747 | B2 * | 11/2014 | Weis | F16K 31/06 |
| | | | | 137/625.44 |
| 9,091,368 | B2 * | 7/2015 | Scheibe | F16K 31/0624 |
| 9,802,198 | B2 * | 10/2017 | Futamata | F16K 7/14 |
| 9,856,993 | B2 * | 1/2018 | Fuchs | H01F 7/066 |
| 10,221,957 | B2 * | 3/2019 | Ohta | F16K 31/06 |
| 10,522,278 | B2 * | 12/2019 | Beuschel | F16K 31/0682 |

FOREIGN PATENT DOCUMENTS

| | | |
|---|---|---|
| CN | 102022577 A | 4/2011 |
| CN | 201925518 U | 8/2011 |
| CN | 203363299 U | 12/2013 |
| CN | 204512606 U | 7/2015 |
| CN | 204611043 U | 9/2015 |
| DE | 4012832 C2 | 3/1995 |
| DE | 10344974 B3 | 2/2005 |
| DE | 19860272 B4 | 3/2005 |
| DE | 60304910 T2 | 11/2006 |
| DE | 102005035449 A1 | 2/2007 |
| DE | 102008060342 B3 | 7/2010 |
| DE | 102009033585 A1 | 1/2011 |
| DE | 102013010536 B3 | 8/2014 |
| WO | 2009/059999 A1 | 5/2009 |
| WO | 2013/011340 A1 | 1/2013 |

OTHER PUBLICATIONS

Office Action dated Jul. 28, 2016 for corresponding German Patent Application No. 10 2015 219 197.4.
International Search Report and Written Opinion dated Jan. 2, 2017 from corresponding International Patent Application No. PCT/EP2016/072370.

* cited by examiner

PNEUMATIC SOLENOID VALVE

The invention relates to a pneumatic solenoid valve.

Pneumatic solenoid valves are used for controlling air flows in a multiplicity of technical fields of application. In these solenoid valves, a magnetic force is generated by means of a magnet coil and a switching process of the valve is triggered as a result. One sector of application of such solenoid valves is the filling of elastic air bladders in a device for the pneumatic adjustment of a seat in a means of transport, such as for example a motor vehicle seat.

A valve arrangement having common winding and valve nozzle carriers for two solenoid valves is known from the document DE 10 2008 060 342 B3. The document WO 2013/011340 A1 furthermore presents a valve arrangement with windings in the pressurized valve chamber.

Document DE 10 2009 033 585 A1 discloses an electromagnetic valve with a permanent magnet, a plunger coil and multiple rockers, which electromagnetic valve, when electrically energized in two polarity directions, opens different sub-valves in each case. In the electrically deenergized state, both sub-valves are closed. For the actuation of the valve, a reversal of the polarity of the supply voltage is necessary.

It is an object of the invention to provide a pneumatic solenoid valve with which three switching positions can be realized in a simple manner.

Said object is achieved by the solenoid valve as claimed in patent claim 1. Refinements of the invention are defined in the dependent claims.

The pneumatic solenoid valve according to the invention comprises an electromagnetic actuator and an air chamber (valve chamber) on which multiple air connectors are provided which are interconnectable, with the interposition of the air chamber, by means of multiple switching positions of the magnetic actuator. The electromagnetic actuator is preferably arranged within the air chamber in order to realize efficient cooling of the actuator by means of air flows in the air chamber. The actuation mechanism described further below is preferably also arranged within said air chamber.

Here, and below, an electromagnetic actuator is to be understood to mean an actuation element which converts electrical energy (that is to say electrical current supplied to the actuator) into a magnetic force by means of which the actuation of the actuator is performed. In general, an electromagnetic actuator comprises a magnet coil which, by means of electrical energization, effects the actuation of the actuator.

The electromagnetic actuator of the solenoid valve according to the invention can assume (at least) three different switching positions by means of unipolar electrical energization of the actuator (in particular of a magnet coil of the actuator) with three different current intensities, wherein the actuator may possibly also have yet further switching positions. Here, in a preferred variant, a current intensity corresponds to the current zero. Unipolar electrical energization with three different current intensities is thus to be understood to mean that the energization with two current intensities is performed with the same non-zero current direction, whereas the energization with the third current intensity either has the same current direction as the energization with the first and second current intensities or is set to zero.

In a first switching position of the electromagnetic actuator, a first sealing element closes a first air connector and a second sealing element opens up a second air connector (that is to say the second air connector is open). In a second switching position of the electromagnetic actuator, the first sealing element closes the first air connector and, also, the second sealing element closes the second air connector. In a third switching position of the actuator, the first sealing element opens up the first air connector, whereas the second sealing element closes the second air connector.

For the closing and opening of the first and second air connectors, the first and second sealing elements can be moved by the electromagnetic actuator by means of a mechanical actuation mechanism, and in particular a lever mechanism. The actuation mechanism is designed such that, upon the change between the first and second switching positions and upon the change between the second and third switching positions, in each case only one out of the first and second sealing elements is moved.

The solenoid valve according to the invention has the advantage that only a single actuator is required for realizing three switching positions. Furthermore, said actuator can be easily actuated by unipolar electrical energization. By means of a suitable actuation mechanism, it is achieved that, upon the change of the switching positions, the sealing elements are movable independently of one another, whereby a straightforward and efficient transition between the switching positions is ensured.

In a particularly preferred embodiment, the electromagnetic actuator comprises an armature composed of magnetically soft material, which armature is moved as a result of electrical energization of a magnet coil and, as a result, acts on the actuation mechanism for the closing and opening of the first and second air connectors. Here, the movement of the armature is preferably a rotation about an axis of rotation.

In a further preferred embodiment of the invention, in the first switching position, the electromagnetic actuator is electrically energized with a first current intensity, and preferably with the current intensity zero (that is to say it is electrically deenergized), whereas, in the second switching position, the electromagnetic actuator is electrically energized with a second current intensity, and in the third switching position, the electromagnetic actuator is electrically energized with a third current intensity, wherein the third current intensity is higher than the second current intensity and the second current intensity is higher than the first current intensity. The closed second switching position of the solenoid valve, which is generally assumed for a relatively long period of time, can thus be realized with a reduced second current intensity and thus reduced power losses. The energy efficiency of the solenoid valve is improved in this way.

In a further preferred embodiment, the first air connector is a feed air connector for the air chamber and the second air connector is an exhaust air connector for the air chamber, or vice versa. Furthermore, a working connector for the filling and/or emptying of a pneumatic unit, preferably of an air bladder, is preferably provided in the solenoid valve. In a preferred variant of the embodiment just described, the feed air connector and the exhaust air connector, on the one hand, and the working port, on the other hand, are arranged on opposite ends of the air chamber, whereby the actuator is cooled in a particularly efficient manner.

In a further, particularly preferred embodiment, the first and second sealing elements can be tilted about separate tilting axes by means of the actuation mechanism. In other words, the first sealing element is tiltable about a different tilting axis than the second sealing element. The reference to the separate tilting axes is to be understood here to mean that the tilting about one tilting axis is not coupled to the tilting about the other tilting axis. The tilting axes are preferably arranged at different spatial positions.

In a further, particularly preferred embodiment, the actuation mechanism is designed as a lever mechanism which comprises a first and a second rocker. The first sealing element is attached to the first rocker, and the second sealing element is attached to the second rocker. The first rocker is tiltable for the purposes of opening and closing the first air connector, and the second rocker is tiltable for the purposes of opening and closing the second air connector. Here, the actuation mechanism is designed such that, during the tilting of one out of the first and second rockers, the other out of the first and second rockers is not tilted.

By virtue of the actuation mechanism being implemented by means of two separate rockers, an opening and closing of the air connectors can be realized with low forces. Furthermore, different force and travel ratios can be realized in order to possibly realize different sealing and actuation forces for the different air connectors.

In a preferred variant of the embodiment just described, upon the change between the first and second switching positions, the actuation mechanism tilts only the second rocker, whereas, upon said change, the first sealing element keeps the first air connector closed by means of an elastic force acting on the first rocker. By contrast, upon the change between the second and third switching positions of the actuation mechanism, the actuation mechanism tilts only the first rocker, whereas the second sealing element keeps the second air connector closed by means of an elastic force acting on the second rocker. In the second switching position, the actuation mechanism assumes a position such that both the first sealing element and the second sealing element keep the respective first and second air connector closed by means of an elastic force acting on the first rocker and an elastic force acting on the second rocker.

In a particularly preferred variant of the embodiment just described, the elastic forces acting on the rockers are generated by a first elastic means and a second elastic means, wherein said means are preferably designed as springs, and in particular as spiral springs. Here, the first elastic means pushes the first rocker with an elastic force in the direction of the closed state of the first air connector, whereas the second elastic means pushes the second rocker with an elastic force in the direction of the closed state of the second air connector.

In a further preferred variant of the rocker mechanism described above, it is furthermore the case that at least one first projection and at least one second projection are provided. The at least one first projection serves for tilting the first rocker, by exertion of force on one end of the first rocker, in order to open the first air connector counter to the elastic force acting on the first rocker. By contrast, the at least one second projection serves for tilting the second rocker, by exertion of force on one end of the second rocker, in order to open the second air connector counter to the elastic force acting on the second rocker. The projections are preferably arranged on the above-described armature, or rigidly connected to said armature.

In a further embodiment of the solenoid valve according to the invention, the first air connector and the second air connector are situated opposite one another and the actuation mechanism comprises a first limb with a first sealing element arranged thereon and a second limb with a second sealing element arranged thereon, wherein the first and second limbs are arranged between the first and second air connectors and can be tilted by means of the electromagnetic actuator.

The first and second limbs are mechanically coupled to one another such that, in the first switching position, the first sealing element closes the first air connector by means of an elastic force acting on the first limb, whereas the second sealing element opens up the second air connector. By contrast, in the second switching position, both the first sealing element and the second sealing element close the first and second air connector, respectively, by means of an elastic force acting on the corresponding first or second limb respectively. In the third switching position, the first sealing element opens up the first air connector, whereas the second sealing element closes the second air connector by means of an elastic force acting on the second limb.

With the variant just described, an actuation mechanism of simple construction can be realized by means of corresponding limbs. The limbs are preferably arranged on the above-described armature, or rigidly connected to said armature.

In a particularly simple variant of the embodiment just described, the actuation mechanism comprises a U-shaped leaf spring, the limbs of which form the first and second limbs and which at least partially and preferably exclusively generates the elastic forces in the first to third switching positions.

Alternatively or in addition, the actuation mechanism may also comprise a spring element (for example a spiral spring) which is positioned between the first and second limbs and which at least partially and possibly also exclusively generates the elastic forces in the first to third switching positions.

In a further preferred embodiment, the actuation mechanism comprises a first stop, which effects the tilting of the first limb. Alternatively or in addition, a second stop may also be provided, which effects the tilting of the second limb. The stops are in turn preferably arranged on the above-described armature, or rigidly connected to said armature.

The solenoid valve according to the invention is preferably provided for the filling and/or emptying of at least one elastic air bladder in a device for the pneumatic adjustment of a seat in a means of transport. In other words, the invention also comprises a device for the pneumatic adjustment of a seat in a means of transport, having at least one elastic air bladder and having a solenoid valve according to the invention for the filling and/or emptying of the at least one air bladder.

Exemplary embodiments of the invention will be described in detail below on the basis of the appended figures.

Below, the invention will be described on the basis of embodiments of 3/3 NO solenoid valves which are used for the filling and venting of an elastic air bladder (not shown) in a device for the pneumatic adjustment of a motor vehicle seat.

Figure 1:
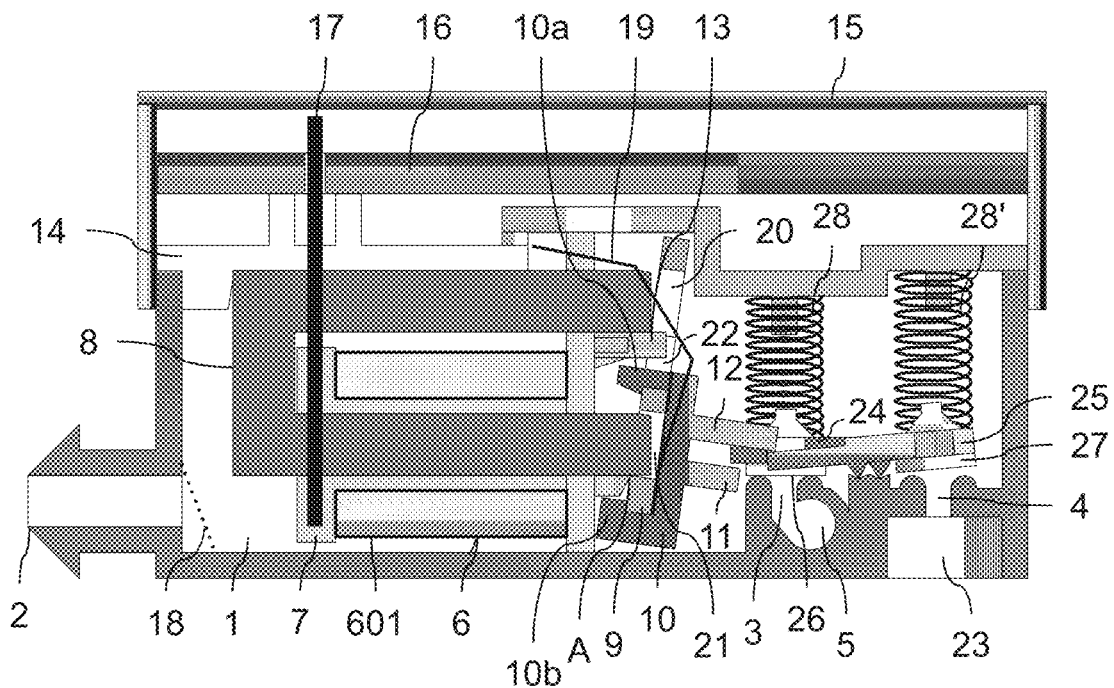
FIG. 1 to FIG. 3 show sectional views of a solenoid valve according to a first embodiment of the invention, in different switching positions.

FIG. 1 shows a solenoid valve according to a first embodiment of the invention. The solenoid valve comprises an air chamber 1 with corresponding air connectors 2, 3 and 4. The upper side of the air chamber is covered in an air-tight manner by a cover plate 14. A circuit board 16 is situated above the cover plate 14, which circuit board 16 in turn is covered by means of a lid 15.

The air connector 2 of the air chamber 1 leads to the air bladder and constitutes the working port of the solenoid valve. The filling of the air bladder is performed by means of a compressed air supply (not shown) which is connected to the channel 5 that is formed on the base of the air chamber 1. The channel 5 is connected to the air chamber 1 via the feed air connector (feed air opening) 3. The exhaust air connector (exhaust air opening) 4, which is in turn arranged on the base of the air chamber and which is connected to the surroundings with the interposition of a damping element 23 composed of foamed material, is utilized for the venting or discharging of compressed air from the air bladder. The noises of the valve that penetrate to the outside are reduced by the damper element.

Arranged within the air chamber 1 is an electromagnetic actuator which effects the opening and closing of the feed air connector 3 and of the exhaust air connector 4 by means of an actuation mechanism (described in more detail further below). The actuator comprises a magnet coil 6 with a winding 601 which is wound on a coil body 7. Furthermore, a U-shaped yoke 8 composed of magnetically soft material is arranged in the air chamber, wherein the lower limb of the U-shaped yoke extends through a cavity of the coil body 7. The upper limb of the yoke 8 runs past the winding 601 of the coil body and extends through an opening in an upper projection of the coil body 7.

Also situated within the air chamber 1 is the armature 9, which is shown in section and which is composed of magnetically soft material and which, when the coil 6 is electrically energized, is rotated by magnetic forces about a single axis of rotation A, as will be discussed in more detail further below. Openings are punched into the armature. The armature comprises in particular an upper opening 20, a T-shaped opening 22 that adjoins the former (see FIG. 5), and a lower opening 21. The openings 20 and 21 are designed so as to be square (see FIG. 5). The lower edge of the opening 21 bears against the lower limb of the yoke 8, whereby a contact line is formed between the yoke and the armature, which contact line also constitutes the axis of rotation A of the armature 9 when the coil 6 is electrically energized. To the armature 9 there is fastened a clip 10 from which multiple projections 11 and 12 protrude, the function of which will be discussed in more detail further below.

Figure 2:
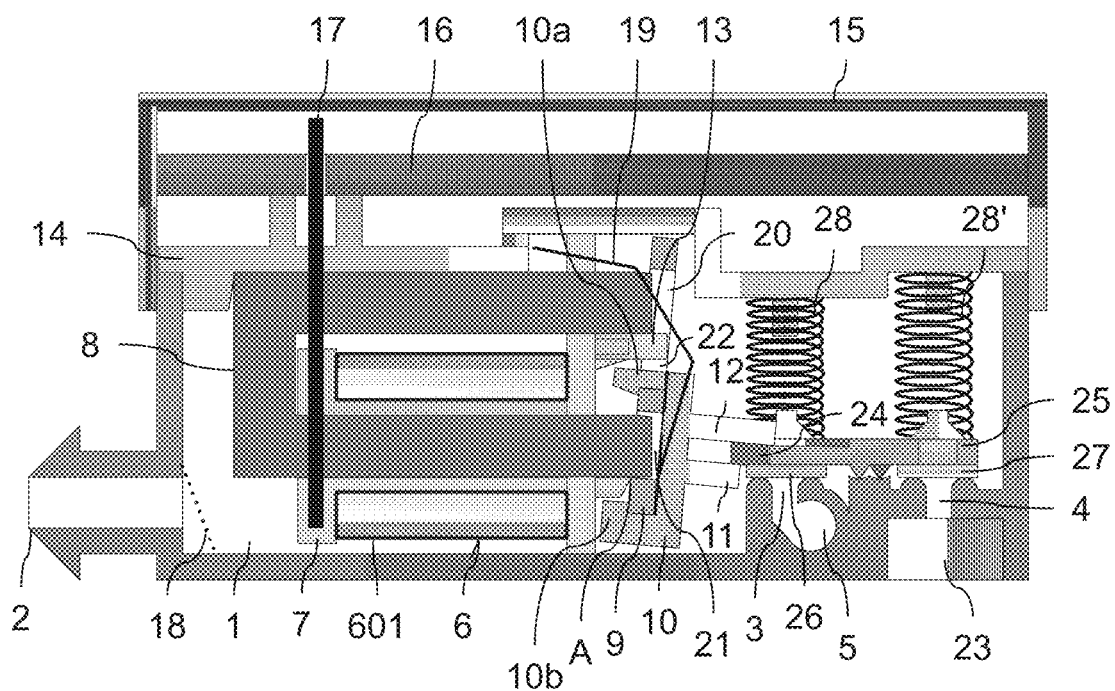
Figure 3:
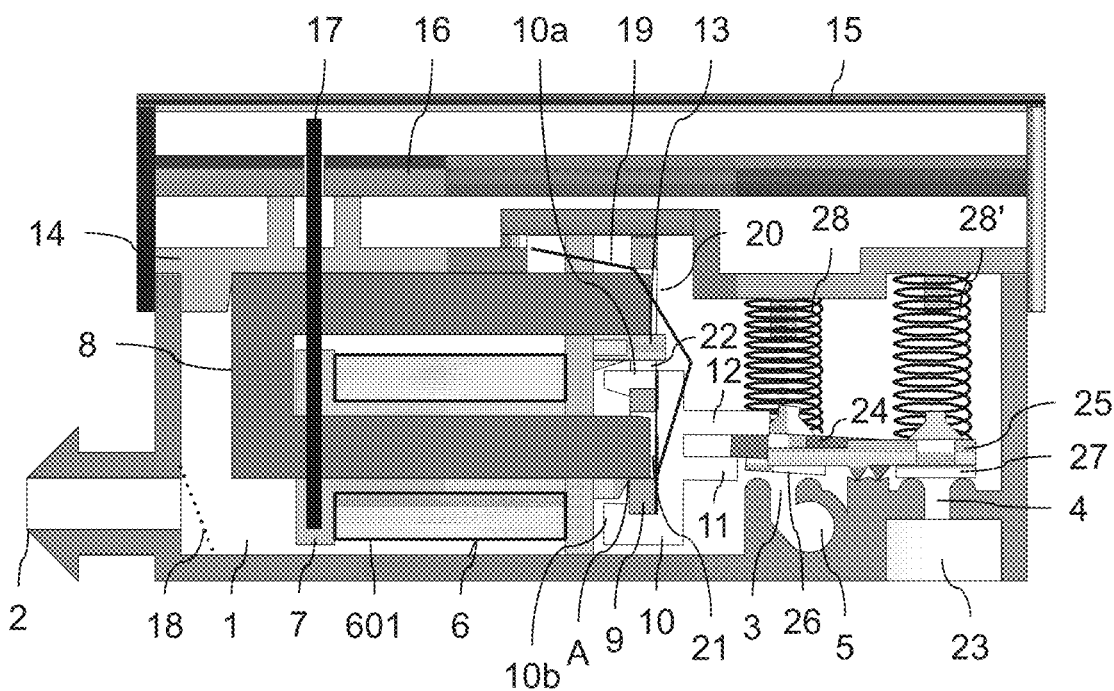

With the solenoid valve of FIG. 1 to FIG. 3, three switching positions can be realized by means of different electrical energization of the magnet coil 6 with the same polarity. Here, FIG. 1 shows the switching position in the case of an electrically deenergized magnet coil, FIG. 2 shows the switching position in the event of electrical energization of the magnet coil with a medium current intensity, and FIG. 3 shows the switching position in the event of electrical energization with a high current intensity. Before a more detailed description will be given of the individual switching positions and the actuating mechanism for the opening and closing of the feed air connector 3 and of the exhaust air connector 4, the construction and interaction of the other components of the solenoid valve will firstly be discussed. In particular, the movement of the armature 9 as a result of electrical energization of the coil 6 will be described in detail.

Figure 5:
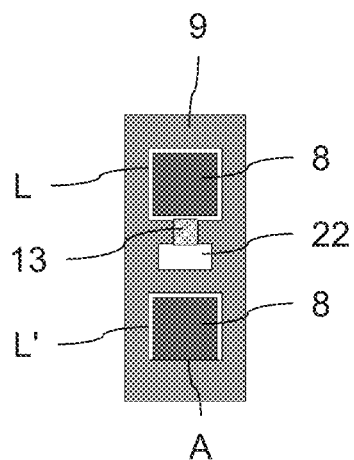
FIG. 5 shows a plan view of the armature installed in the solenoid valve of FIG. 1.

The coil body 7 comprises a guide lug 13 which prevents tilting of the axis of rotation A of the armature 9 by virtue of the guide lug being guided in the opening 22 (see FIG. 5). When the coil 6 is electrically energized, a magnetic force is generated which pulls the armature 9 toward the yoke 8. Here, the four edges of the upper square opening 20 overlap the upper end of the yoke 8. A corresponding overlap of three edges of the lower opening 21 and the lower end of the yoke 8 is likewise enlarged.

In the magnet coil shown, the air gap L between the edges of the upper square opening 20 and the yoke 8 and the air gap L' between the edges of the lower square opening 21 and the yoke 8, in the direction of the rotation of the armature, remain substantially constant independently of the size of the overlap between the yoke and the armature. This is illustrated once more in FIG. 5. In particular, the air gap L between the edge of the upper opening 20 and the upper limb of the yoke 8, and the air gap L' between the edge of the lower opening 21 and the lower limb of the yoke 8 can be seen here. It is to be noted here that there is no air gap along the lower edge of the opening 21, because the yoke and the armature make direct contact with one another there at a contact line. The axis of rotation A of the armature runs along said contact line, as has already been mentioned at the outset.

According to FIG. 5, the size of the air gap L or L' respectively is constant along the edges of the opening. It is however not mandatory for this to be implemented in such a manner. Rather, it is crucial that the spacing formed by the air gaps between the armature 9 and the yoke 8 remains constant in the direction of rotation of the armature, that is to say along respective lines running perpendicularly to the sheet plane. By contrast, the size of the air gap may optionally vary along the circumference of the openings 20 and 21. In particular, the left and the right side of the air gap L' may for example also run downward in a slightly oblique manner. It is thereby achieved that the armature is centered relative to the yoke in the region of the axis of rotation A. The size of the air gap at the remaining edges is approximately 0.2 mm.

Owing to the substantially constant air gap in the direction of the rotation of the armature 9, it is achieved that the magnetic force acting on the armature is dependent only on the current and not on how close the armature has come to the yoke. With the solenoid valve of FIG. 1, a proportional valve is thus realized, the magnetic force of which is constant in the case of constant electrical energization of the coil. Here, a leaf spring 19 which acts counter to the magnetic force and thus generates a restoring force is also provided in the solenoid valve of FIG. 1. The leaf spring is, in the upper region, fastened to the coil body 7 and, in the lower region, fastened to the armature 9 and to the clip 10. The restoring force becomes ever greater with progressive rotation of the armature when the coil is electrically energized, until said restoring force is finally equal to the constant magnetic force whose magnitude is defined by the current intensity of the electrically energized coil. The construction of the leaf spring 19 will be discussed in more detail further below on the basis of FIG. 6. The construction of the clip 10 will likewise be discussed in more detail further below on the basis of FIG. 7.

As can be seen from FIG. 2 and FIG. 3, the electrical energization of the coil leads to a rotation of the armature 9 about the axis of rotation A. The electrical energization of the winding 601 of the coil 6 is performed here by way of electrical pins 17 which extend through an opening of the cover plate 14 and which are connected to a corresponding electrical contact of the circuit board 16. The opening in the cover plate is sealed, for example by adhesive bonding, press fitting, or injection molding. Therefore, no air exits the pressurized air chamber 1 via said opening. A mesh filter 18 which prevents the ingress of particles from the elastic air bladder can also be seen in FIG. 1.

Furthermore, the shape of the central opening 22 of the armature 9 can be seen in FIG. 5 already mentioned above. The opening has the shape of an upside-down letter T, wherein the guide lug 13 engages in the vertical beam of the letter T, which guide lug prevents lateral tilting of the armature 9. By contrast, the vertical beam of the letter T serves for the passage of an upper detent lug 10a of the clip 10. Said detent lug can be seen very clearly from FIG. 7, which is discussed further below.

Figure 6:
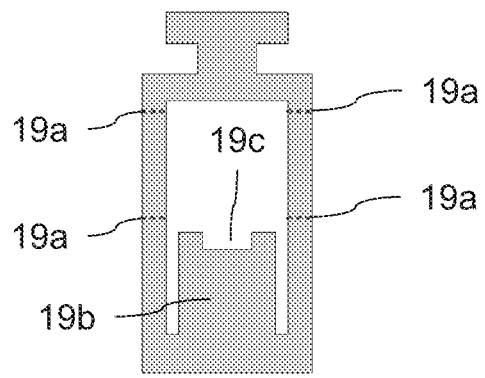
FIG. 6 shows a plan view of the leaf spring installed in the solenoid valve of FIG. 1.

The leaf spring 19 illustrated in section in FIG. 1 can be seen once again in plan view in FIG. 6. The leaf spring is composed of a metal sheet which is bent at four locations 19a. At the upper end, the leaf spring has a T shape. There, the leaf spring is fastened to the coil body 7. A protruding tab 19b with a recess 19c is situated within a central opening of the leaf spring. In the installed state of the leaf spring, the tab 19b bears against the inner surface of the clip 10, wherein the detent lug 10a of the clip 10 has been pushed over the recess 19c. The lower part of the armature 9 is inserted into the clip 10 with the tab 19b inserted therein. Here, the armature is engaged on the clip 10 with detent action by means of the detent lug 10a and the two lower detent lugs 10b (see FIG. 7). A corresponding restoring force is generated by virtue of the tab 19b being bent in relation to the remaining part of the leaf spring 19. With increasing rotation of the armature when the coil is electrically energized, said restoring force becomes greater until the end position is reached, in which the generated magnetic force corresponds to the restoring force of the leaf spring.

Figure 7:
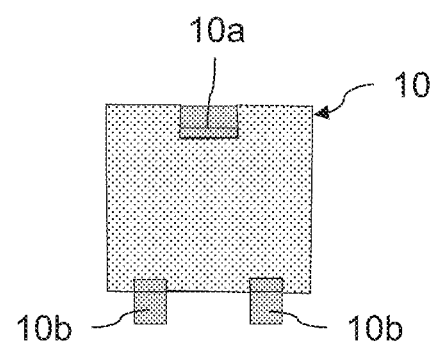
FIG. 7 shows a plan view of the clip installed in the solenoid valve of FIG. 1.

By means of the leaf spring 19, in the installed state, it is firstly the case that a force is generated which pulls the armature 9 upward and in the direction of the magnet coil in order to fix the axis of rotation A of the armature 9. Secondly, the deformation of the leaf spring at the level of the axis of rotation A generates a torque which tilts the armature away from the coil 6, such that, when the coil is electrically deenergized, the armature assumes the first switching position from FIG. 1. Said torque is absorbed by the engagement of the leaf spring on the upper end of the coil carrier 7 with detent action. As already mentioned, FIG. 7 shows a plan view of the clip 10 from FIG. 1. Here, the three projections 10a and 10b with which the armature is engaged in the clip with detent action can be seen.

The actuation mechanism for the opening and closing of the feed air connector 3 and of the exhaust air connector 4 will be discussed in detail below. Said actuation mechanism comprises, in addition to the projections 11 and 12 formed on the clip 10, a first rocker 24 and a second rocker 25, which are rotatable about different axes of rotation, as is schematically indicated in FIG. 1 by downwardly pointing wedges on the corresponding rockers. On the left-hand arm of the first rocker 24, on the bottom side thereof, there is provided a first sealing element 26 which serves for closing the feed air connector 3. Analogously, on the bottom side of the right-hand arm of the second rocker 25, there is provided a second sealing element 27 which serves for closing the exhaust air connector 4.

Furthermore, a first spiral spring 28 is positioned between the cover plate 14 and the left-hand arm of the first rocker 24. In the same way, a second spiral spring 28' is arranged between the cover plate 14 and the right-hand arm of the second rocker 25. The two springs each exert an elastic force on the corresponding arms of the rockers.

Figure 4:
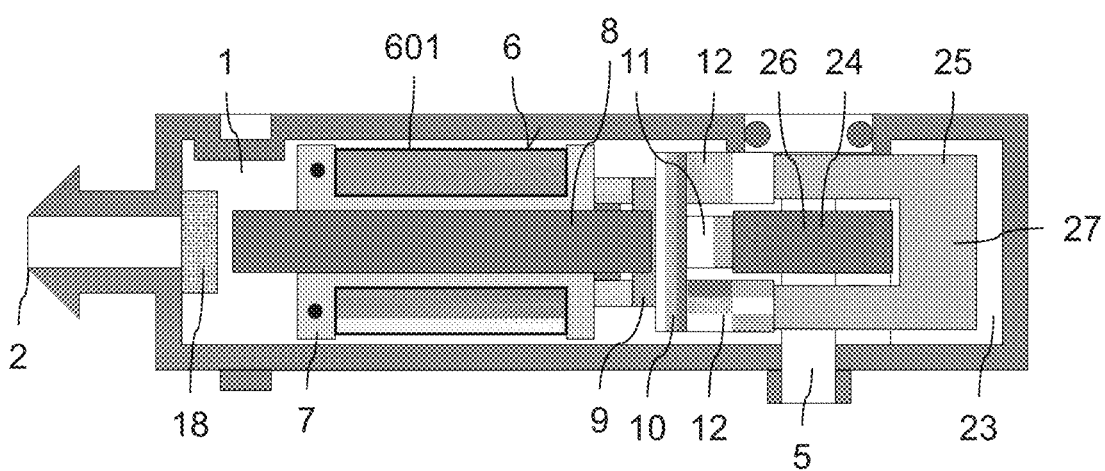
FIG. 4 shows a plan view of the solenoid valve of FIG. 1 from above.

The construction of the two rockers 24 and 25 and of the projections 11 and 12 can also be seen from the partially sectional plan view in FIG. 4. The section in said plan view extends along a plane running through the rockers. As can be seen from FIG. 4, the first rocker 24 is of rectangular form. Said rocker 24 is engaged around by the second rocker 25 of U-shaped design, that is to say a major part of the rocker 24 is situated between the two legs of the U shape of the rocker 25. The rocker 24 interacts, at its left-hand end, with the projection 11, which protrudes centrally out of the clip 10 and which, at its right-hand end, extends across the bottom side of the rocker 24. By contrast, the rocker 25 interacts with the two projections 12 that are arranged to the left and to the right on the clip 10. The right-hand ends of the two projections 12 extend across the top side of the corresponding limbs of the U shape of the second rocker 25.

In the switching position shown in FIG. 1, the electromagnetic actuator is not electrically energized. In this switching position, the upper projections 12 press against the top side of the second rocker 25. The force that is exerted here is greater than the elastic force of the spiral spring 28', such that a lift-off of the sealing element 27, and thus an opening of the exhaust-air opening 4, occurs. By contrast to this, in the switching position of FIG. 1, the projection 11 does not interact with the first rocker 24. Accordingly, the first rocker 24 is pushed downward by means of the elastic force of the spiral spring 28, whereby the feed air opening 3 of the feed air duct 5 is closed. Venting of the air bladder connected to the working port 2 is thus realized in the switching position of FIG. 1.

In the switching position in FIG. 2, the magnet coil 6 is electrically energized with a medium current intensity, as has already been discussed above. This leads to a rotation of the armature 9 about the axis A until the middle position shown in FIG. 2 is reached. In said position, the projections 11 and 12 make contact with the corresponding rockers with low force, or no contact occurs between at least one rocker and the associated projection. Accordingly, both the feed air connector 3 and the exhaust air connector 4 are substantially closed by means of the sealing elements 26 and 27 by means of the force of the two springs 28 and 28'.

FIG. 3 shows the third switching position of the solenoid valve, in which the magnet coil 6 is electrically energized with a high current intensity. As a result, the armature 9 assumes a vertical position, in which the projection 11 presses from below against the rocker 24, such that the sealing element 26 is raised and the feed air connector 3 is opened up. By contrast, the projections 12 do not interact with the rocker 25, such that the exhaust-air opening 4 is kept in the closed state by means of the spring force of the spiral spring 28'. Filling of the air bladder connected to the working port 2 is thus realized in the third switching position of FIG. 3.

The first embodiment of the invention discussed on the basis of FIG. 1 to FIG. 4 has the advantage that a short armature adjustment travel with simultaneously low force is required in the case of medium or full actuation of the valve. Here, in a preferred variant, as spiral springs 28 and 28', use is made of springs with a very flat characteristic curve, that is to say springs which exhibit a small change in force per unit of travel. A further advantage of the first embodiment consists in that the feed-air and exhaust-air connectors are situated in one component (the housing of the air chamber) and thus exhibit small tolerances relative to one another.

In a preferred variant, the rockers 24 and 25 of the first embodiment are guided, and secured against lateral displacement, in the center by a web or a peg. Thus, the sealing elements always make contact with the associated nozzle seats at the same location, whereby an improved sealing action is realized.

Furthermore, in the first embodiment, by means of the projections 11 and 12 on the one hand and the rockers 24 and 25 on the other hand, different force or travel ratios are realized on the basis of the lever rule in order to realize, for example, different actuation forces for the feed air connector and for the exhaust-air connector. Here, in particular, a relatively low actuation force is required for the exhaust-air connector because the latter is additionally pressed against by the pressure of the air bladder (corresponds to the pressure in the air chamber), whereas the feed air connector must always also seal counter to an admission pressure.

In a further refinement of the embodiment just described, the rockers may be manufactured from spring steel sheet. Stiffening in the required regions may be realized here by means of upturned edge strips. It is likewise possible for the rockers and the associated springs to each be manufactured from one part. The rockers 24 and 25 are then fixed to the housing of the air chamber 1 by means of the associated springs 28 and 28'. In this way, the sealing elements 26 and 27 are prevented from being displaced relative to the nozzle seats of the feed-air and exhaust-air connectors after multiple actuations.

In the first embodiment, the middle position of the armature corresponding to FIG. 2 requires a considerably lower magnetic force than the fully deflected position of the armature corresponding to FIG. 3. The power losses of the electromagnetic actuator are reduced in accordance with said force. The middle armature position with relatively low power losses is typically maintained for a longer time period (for example 1 s to 5 min) than the maximum position of the armature, which is required during a relatively short time of the filling of the air bladder (for example 0.5 s to 5 s). Accordingly, only low power losses are generated by the solenoid valve of the first embodiment. The same applies to the solenoid valves, discussed below, of the second and third embodiments.

A second and a third embodiment of the solenoid valve according to the invention will be discussed below on the basis of FIG. 8 to FIG. 13. These embodiments use the same construction of a magnet coil with rotatable armature, such that the actuation of the armature will not be discussed in detail again. The second and the third embodiment differ from the first embodiment by the mechanism of the actuation of the first and second sealing elements. Accordingly, primarily said actuation mechanism will be discussed in the following description of FIG. 8 to FIG. 13.

Figure 8:
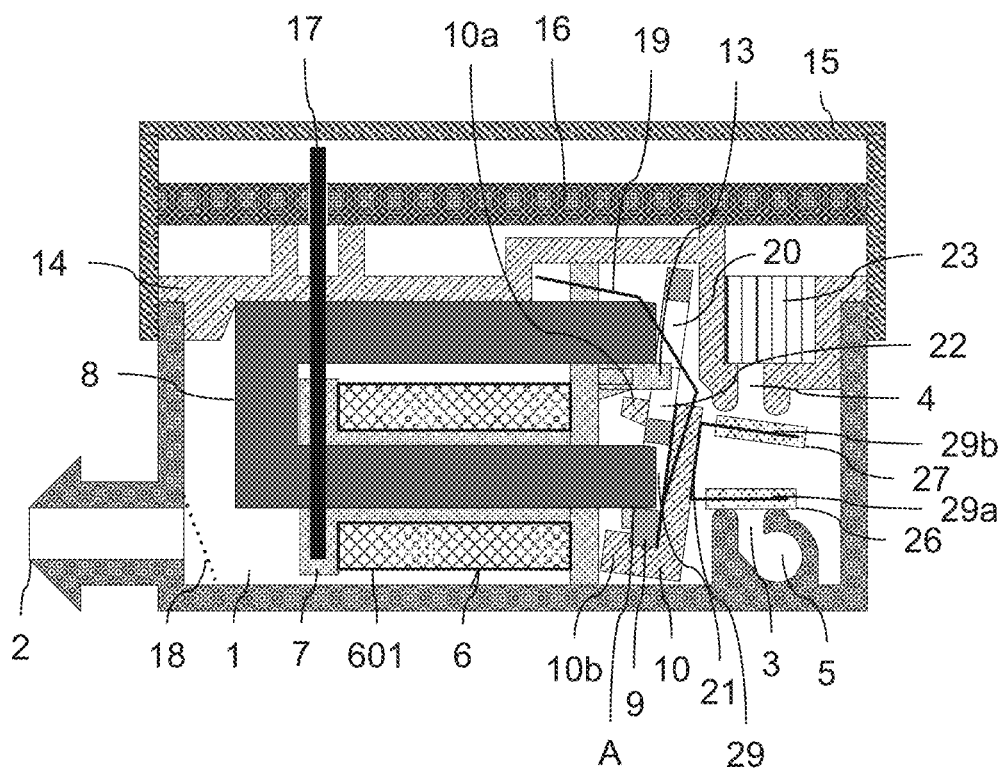
FIG. 8 to FIG. 10 show sectional views of a solenoid valve according to a second embodiment of the invention, in different switching positions.
Figure 9:
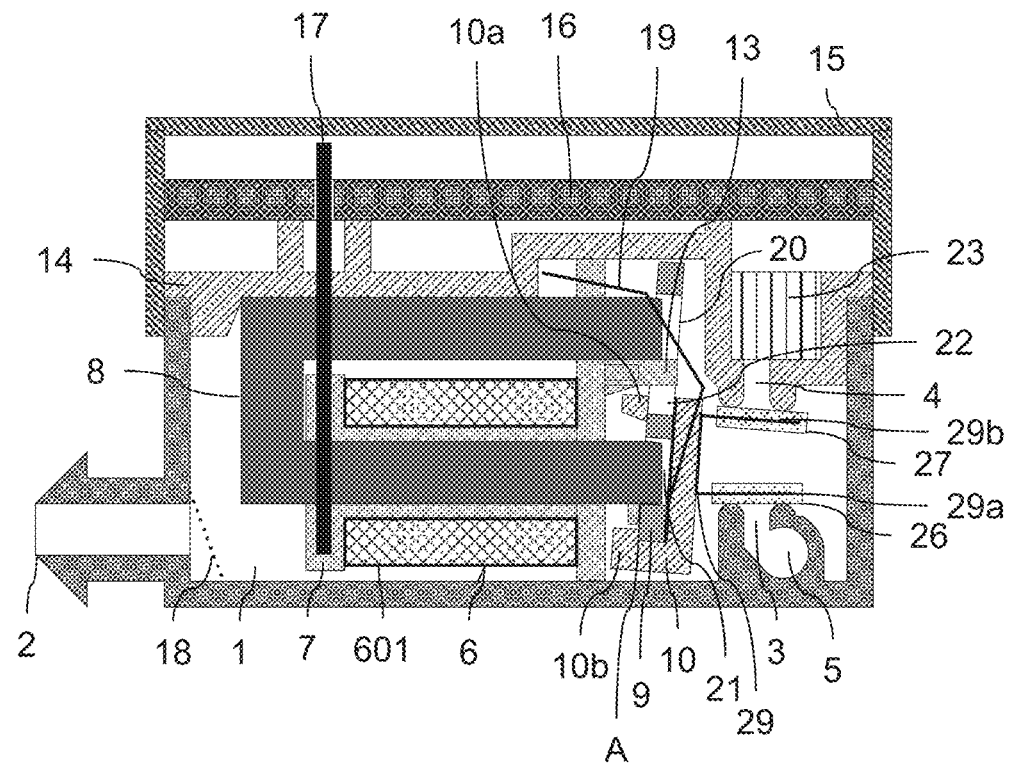
Figure 10:
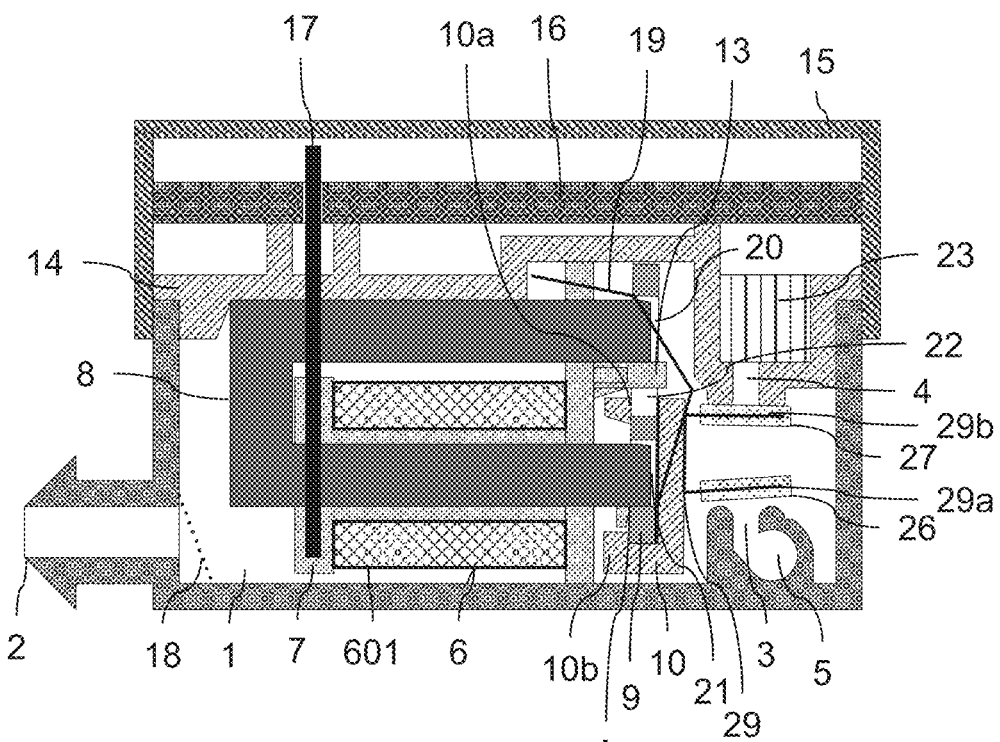

FIG. 8 to FIG. 10 show the second embodiment of a solenoid valve according to the invention. FIG. 8 corresponds in turn to the first switching position of the solenoid valve in the case of an electrically deenergized magnet coil 6, FIG. 9 corresponds to the second switching position of the solenoid valve in the case of electrical energization of the magnet coil with a median current intensity, and FIG. 10 corresponds to the third switching position of the solenoid valve in the case of electrical energization of the magnet coil with a high current intensity. In the solenoid valve of FIGS. 8 to 10, the feed-air connector 3 and exhaust-air connector 4 are now situated no longer adjacent to one another but rather one above the other. In particular, the feed-air connector 3 is situated on the base of the air chamber, whereas the exhaust-air connector 4 is provided in the upper cover plate 14 of the air chamber. As an actuation mechanism, use is now made no longer of a rocker but rather of a U-shaped leaf spring, which is positioned between feed-air connector 3 and exhaust-air connector 4. The central part of said leaf spring 29 is fastened to the clip 10, which in turn is connected to the armature 9. The sealing element 26 is provided on the lower limb 29a of the leaf spring 29, and the sealing element 27 is provided on the upper limb 29b of the leaf spring 29. In the first switching position of FIG. 8, the lower limb 29a presses against the feed-air connector 3 with the elastic force of the leaf spring, such that the sealing element 26 closes said connector. By contrast, the limb 29b and the corresponding sealing element 27 are lifted off from the exhaust-air opening 4, such that the latter is open in the switching position of FIG. 8.

In the second switching position as per FIG. 9, the armature 9 is situated in a middle position. In said position, the two nozzle seats of the connectors 3 and 4 are sealed off by the respective sealing elements 26 and 27. The U-shaped leaf spring presses both sealing elements against the nozzle seats, in each case with a reduced force. Said reduced force suffices to ensure an adequate sealing action for holding the air in the connected air bladder for a limited time (for example a few seconds to a few minutes).

In the third switching position of FIG. 10, in which the magnet coil 6 is electrically energized with a high current intensity, the armature is situated in the position of maximum travel. In this position, the upper limb 29b now presses against the exhaust-air connector 4 with the elastic force of the spring, such that said exhaust-air connector is closed by the sealing element 27. By contrast, the lower limb is free from forces and is lifted off from the feed-air connector 3, such that said feed-air connector is open.

The embodiment described on the basis of FIG. 8 to FIG. 10 has the advantage that the actuation mechanism is realized in a very simple form, and requires a small number of components. The assembly of the solenoid valve is thus simplified.

In the second embodiment, as material for the sealing elements 26 and 27, use is preferably made of a material which is uniformly elastic over the functional temperature range (for example silicone). It is hereby taken into consideration that, depending on the switching position, the sealing elements can make contact with the associated nozzle seats at slightly different angles.

In a modification of the second embodiment, the lengths of the two limbs 29a and 29b of the U-shaped leaf spring 29 are selected to differ. In this way, on the basis of the lever rule, it is possible to realize different force or travel ratios, such that different sealing forces can be realized for the feed-air and exhaust-air openings.

In an advantageous variant of the second embodiment, the contact points between the sealing elements and the nozzle seats can be relocated into the plane of the effective axes of rotation of the armature or of the ends of the U-shaped leaf spring, in order to minimize sliding friction during the movement.

Figure 11:
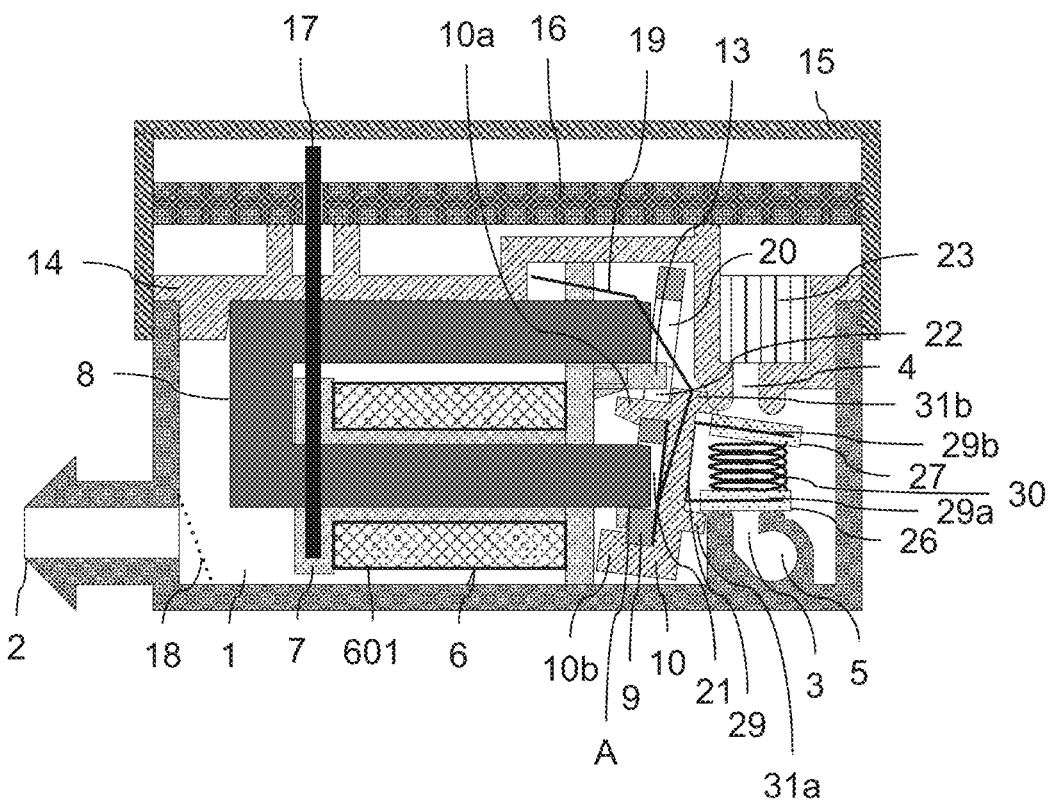
FIG. 11 to FIG. 13 show sectional views of a solenoid valve according to a third embodiment of the invention, in different switching positions.
Figure 12:
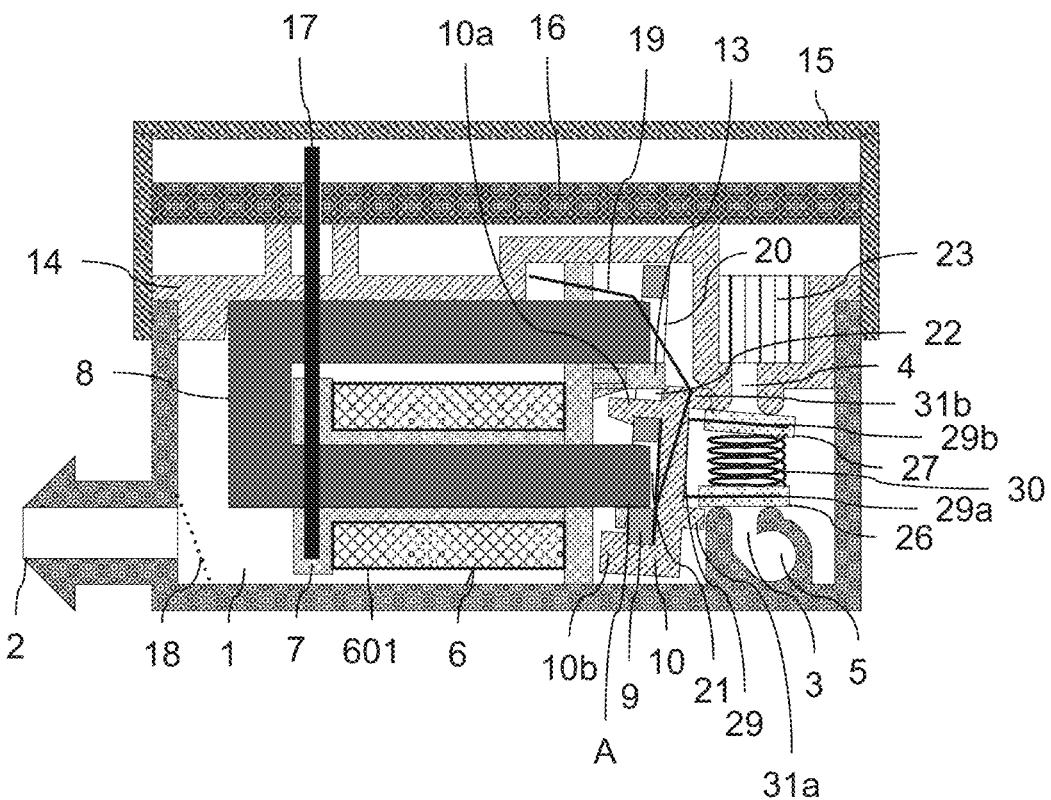
Figure 13:
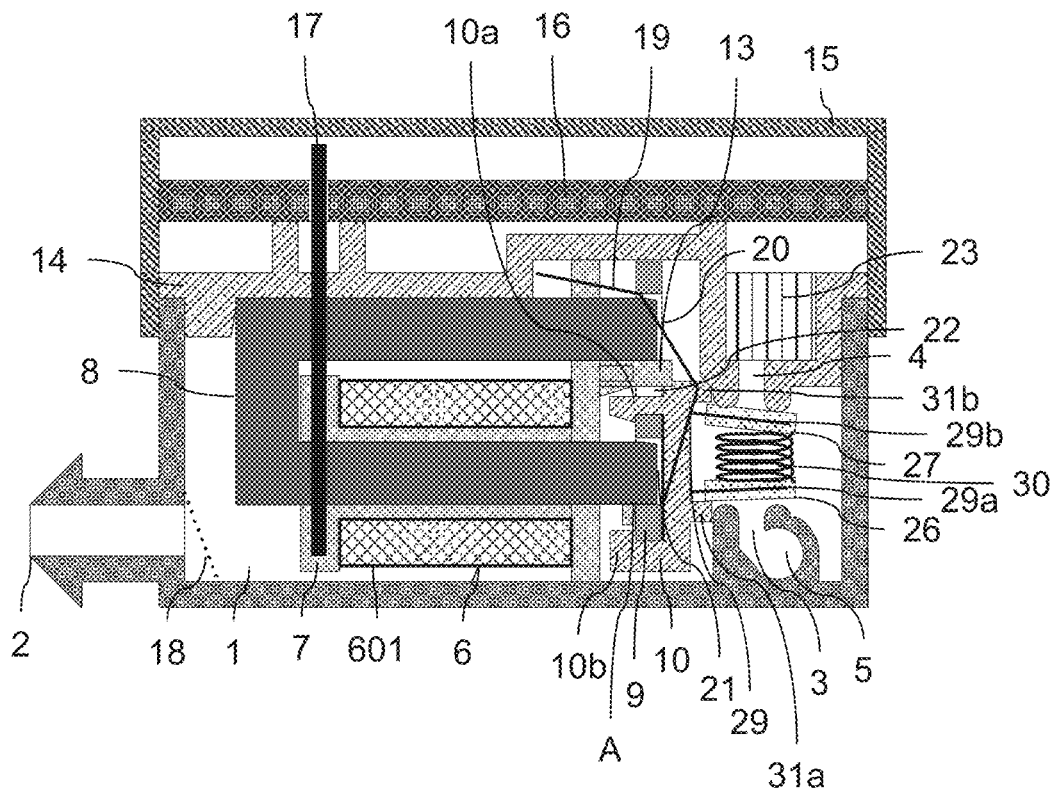

FIG. 11 to FIG. 13 show a third embodiment of the solenoid valve according to the invention. The actuation mechanism of said embodiment differs from the actuation mechanism of the embodiment of FIG. 8 to FIG. 10 in that a spiral spring 30 is additionally arranged between the two limbs 29a and 29b of the leaf spring 29 and thus between the sealing elements 26 and 27.

In the embodiment of FIG. 11 to FIG. 13, the U-shaped leaf spring 29 has only a negligible spring stiffness, and thus acts substantially in the manner of two joints at the foot points, situated on the clip 10, of the limbs of the leaf spring. The required elastic force is now generated by means of the spiral spring 30, which is compressed between the two limbs of the leaf spring 29. Furthermore, in the third embodiment, a first stop 31a and a second stop 31b are provided on the right-hand side of the clip 10. By means of said stops, the sealing elements are lifted off from the nozzle seats of the feed-air connector and of the exhaust-air connector, as will be discussed in more detail below.

FIG. 11 in turn shows the first switching position of the solenoid valve in the case of an electrically deenergized magnet coil 6. In this switching position, the sealing element 26 is pressed against the nozzle seat of the feed-air opening 3 by means of the compressed spring 30, such that the feed-air opening is closed. By contrast, the exhaust-air opening 4 is open, which is achieved by virtue of the stop 31b pushing the limb 29b downward. In the middle switching position shown in FIG. 12 (that is to say in the case of medium electrical energization of the magnet coil), both sealing elements 26 and 27 bear against the respective nozzle seats and are pressed against the latter by the spiral spring 30, which is now compressed to a lesser extent, by means of the spring force thereof, such that both the feed-air connector and the exhaust-air connector are closed. In the third switching position as per FIG. 13 (high electrical energization of the magnet coil), the stop 31b raises the lower limb 29a, whereby the feed-air connector 3 is opened up. Furthermore, the compression of the spiral spring 30 is increased, whereby the sealing element 27 is pressed firmly against the exhaust-air connector 4.

The advantage of the third embodiment just described lies in the improved utilization of the actuation force and in the improved manageability of the spring tolerances of a spiral spring in relation to the leaf spring from FIG. 8 to FIG. 10.

In a modification of the third embodiment, the limbs 29a and 29b are not constituent parts of a leaf spring, but rather are corresponding projections which are articulated on the clip of the armature by means of a hinge (in particular a film hinge). Otherwise, the above-described options of the second embodiment are also applicable to the third embodiment.

The above-described embodiments of the invention have numerous advantages. In particular, different switching positions of a solenoid valve can be realized with unipolar electrical energization of the valve. Upon the change of the switching positions, it is furthermore achieved, by means of a suitable actuation mechanism, that only one of two sealing elements is moved, such that three switching positions can be realized by means of one single electromagnetic actuator. The structural size of the solenoid valve can be reduced in this way. Furthermore, the solenoid valve can be operated with reduced power losses owing to a switching position with medium electrical energization.

LIST OF REFERENCE DESIGNATIONS

1 Air chamber
100, 100' Electromagnetic actuators
2, 3, 4 Air connectors
5 Air channel
6 Magnet coil
601 Winding of the magnet coil
7 Coil body of the magnet coil
8 Yoke
9 Armature
10 Clip
10a, 10b Detent lugs of the clip
11, 12 Projections of the clip
13 Guide lug of the coil body
14 Cover plate
15 Lid
16 Circuit board
17 Pin
18 Mesh filter
19 Leaf spring
19a Bend points of the leaf spring
19b Tab of the leaf spring
19c Recess on the tab of the leaf spring
20, 21, 22 Openings in the armature
23 Damping element
24, 25 Rockers
26, 27 Sealing elements
28, 28' Spiral springs
29 U-shaped leaf spring
29a, 29b Limbs of the U-shaped leaf spring
30 Spiral spring
31a, 31b Stops
L, L' Air gaps
A Axis of rotation

The invention claimed is:

1. A pneumatic solenoid valve, comprising:
an electromagnetic actuator and an air chamber on which multiple air connectors are provided which are interconnectable, with interposition of the air chamber, by means of multiple switching positions of the magnetic actuator, wherein
the electromagnetic actuator is configured to assume three different switching positions by unipolar electrical energization of the actuator with three different electrical current intensities, wherein, in a first switching position, a first sealing element closes a first air connector and a second sealing element opens up a second air connector, wherein, in a second switching position, the first sealing element closes the first air connector and the second sealing element closes the second air connector, and wherein, in a third switching position, the first sealing element opens up the first air connector and the second sealing element closes the second air connector;
for closing and opening of the first and second air connectors, the first and second sealing elements are movable by the electromagnetic actuator by an actuation mechanism, wherein the actuation mechanism is designed such that, upon change between the first and second switching positions and upon the change between the second and third switching positions, in each case only one out of the first and second sealing elements is moved; and
wherein the first air connector and the second air connector are situated opposite one another and the actuation mechanism comprises a first limb with a first sealing element arranged thereon and a second limb with a second sealing element arranged thereon, wherein the first and second limbs are arranged between the first and second air connectors and can be tilted by the electromagnetic actuator, wherein the first and second limbs are mechanically coupled to one another such that, in the first switching position, the first sealing element closes the first air connector by an elastic force acting on the first limb, whereas the second sealing element opens up the second air connector;

in the second switching position, the first sealing element closes the first air connector by an elastic force acting on the first limb, and the second sealing element closes the second air connector by an elastic force acting on the second limb; and in the third switching position, the first sealing element opens up the first air connector, whereas the second sealing element closes the second air connector by an elastic force acting on the second limb.

2. The solenoid valve as claimed in claim 1, wherein the electromagnetic actuator comprises an armature comprising magnetically soft material, which armature is moved as a result of electrical energization of a magnet coil and, as a result, acts on the actuation mechanism for the closing and opening of the first and second air connectors.

3. The solenoid valve as claimed in claim 1, wherein, in the first switching position, the electromagnetic actuator is electrically energized with a first current intensity of zero, in the second switching position, the electromagnetic actuator is electrically energized with a second current intensity, and in the third switching position, the electromagnetic actuator is electrically energized with a third current intensity, wherein the third current intensity is higher than the second current intensity and the second current intensity is higher than the first current intensity.

4. The solenoid valve as claimed in claim 1, wherein at least one of, the first air connector is a feed connector for the air chamber and the second air connector is an exhaust air connector for the air chamber, and vice versa.

5. The solenoid valve as claimed in claim 1, wherein the first and second sealing elements can be tilted about separate tilting axes by the actuation mechanism.

6. The solenoid valve as claimed in claim 1, wherein the actuation mechanism comprises a U-shaped leaf spring, the limbs of which form the first and second limbs and which at least partially generates the elastic forces in the first to third switching positions.

7. The solenoid valve as claimed in claim 1, wherein the actuation mechanism comprises a spring element which is positioned between the first and second limbs and which at least partially generates the elastic forces in the first to third switching positions.

8. The solenoid valve as claimed in claim 1, wherein the actuation mechanism comprises a first stop, which effects tilting of the first limb, and/or in that the actuation mechanism comprises a second stop, which effects the tilting of the second limb.

* * * * *